Figure 2:
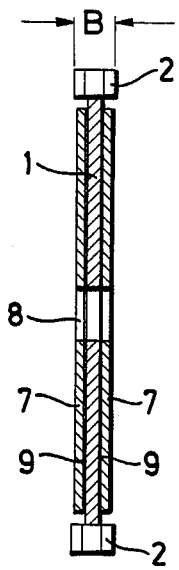

United States Patent [19]

Saljé et al.

[11] 4,106,382
[45] Aug. 15, 1978

[54] CIRCULAR SAW TOOL

[75] Inventors: Ernst Saljé, Schulheide 4, D 2106 Bendestorf, Germany; Ulrich Bartsch, Brunswick, Germany

[73] Assignee: Ernst Saljé, Bendestorf, Germany

[21] Appl. No.: 800,049

[22] Filed: May 24, 1977

[30] Foreign Application Priority Data

May 25, 1976 [DE] Fed. Rep. of Germany ....... 2623339

[51] Int. Cl.² ............................................. B27B 33/08
[52] U.S. Cl. ........................................ 83/835; 83/676
[58] Field of Search .................... 83/835, 676; 76/112; 51/206 R

[56] References Cited

U.S. PATENT DOCUMENTS

| 1,083,645 | 1/1914 | Wettstein | 83/835 |
| 2,624,381 | 1/1953 | Von Der Werth | 83/835 |
| 3,799,025 | 3/1974 | Tsunoda | 83/835 |
| 3,812,755 | 5/1974 | Danielsen | 76/112 X |
| 3,854,364 | 12/1974 | Sundstrom | 83/835 |
| 3,990,338 | 11/1976 | Wikner et al. | 76/112 X |

*Primary Examiner*—Frank T. Yost
*Attorney, Agent, or Firm*—Holman & Stern

[57] ABSTRACT

Circular saw tool, with a single-ply or multi-ply disc-shaped saw blade and teeth distributed over the circumference thereof, the saw blade being provided on each side with a bonded covering.

6 Claims, 5 Drawing Figures

U.S. Patent  Aug. 15, 1978  Sheet 1 of 2  4,106,382

CIRCULAR SAW TOOL

The invention relates to a circular saw tool, more particularly for timber and timber substances, with a single-ply or multi-ply disc-shaped saw blade and teeth distributed over the circumference thereof.

In the course of the cutting operation as well as when idling, rotating saw blades radiate noise which can be exceptionally unpleasant as regards frequency and sound pressure and represents a nuisance for the environment. In the course of the cutting operation the saw blade is excited into vibrations at a frequency which is proportional to the rotational speed and the number of teeth. When idling, the saw blade is excited into free axial vibrations due to the vortex effect of the air on the saw teeth, such vibrations being primarily responsible for the idling noise, in this case more particularly the so-called whistling of the saw blades. Vibrations of this kind usually have a large amplitude at a discrete frequency, namely the whistling frequency. The air-borne sound which is radiated when idling is thus caused substantially by the sound pressure of the above-mentioned whistling frequency.

In the production of saw blades the individual saw blade is frequently specially processed by hammering or rolling in order to impart a specific internal stress to the saw blade. If the internal stress, which cannot be quantitatively defined, is correctly adjusted, this being a matter which requires the experience of an expert, the tendency of such saw blade to whistle can be reduced if the subsequent idling speed is known. However, this does not represent a reliable method. Moreover, such processing of the saw blade is a complex procedure.

It is an object of the invention to overcome existing disadvantages and defects and to provide a circular saw tool which has an advantageous noise characteristic, more particularly as regards the noise which occurs during the operating or cutting operation, and while having an uncomplicated construction which can be readily embodied so as to meet the requirements of different applications.

According to the present invention, the saw blade forming the tool is provided on each side with a bonded covering.

The covering on both sides, which is unrelated to the cutting function of the tool and the forces associated therewith, and is connected to the saw blade by the relevant layer of adhesive or with an intermediate layer and therefore does not form a load-bearing or supporting element for the teeth, provides an encapsulation which reduces the noise radiated by the saw blade. The purpose of the layer of adhesive between the saw blade and the covering is not merely to retain the covering on the saw blade but it also fulfills the function of noise suppression. An adhesive which has a high degree of elasticity with moderate hardness is advantageous for this function.

The invention points to an advantageous method by which noise radiated from the tool in the circular sawing of timber and similar processes during the cutting operation is substantially reduced and the unpleasant whistling which occurs in idling at specific tool speeds, usually defined by the machine, is suppressed. The tool can nevertheless be produced simply and without the use of prestressing operations and the like which can be performed only by feel. It can be constructed as a circular saw, a scribing saw or a similar tool.

The covering more particularly is very thin and can be less than 1 millimeter. The frequency range at which the suppressing action of the covering is a maximum in a particular case can be obtained by suitable choice of the thickness and of the material of the covering.

Different materials can be used for the covering. More particularly, the invention provides that the covering consists of metal. Advantageous results are obtained by a covering of brass or a similar alloy.

The shape and size of the covering can depend on the kind and construction of the tool. Advantageously the covering extends substantially from the middle bore of the saw blade to approximately the base of the tooth gaps. More particularly, the covering can have the shape of a round blank.

Advantageously, the total thickness of the saw blade with the covering bonded on both sides is less, at least in the outer edge region, than the maximum width of the tool in the region of the teeth so that the saw blade is able to cut freely. Another construction can also be adopted for a tool in which the required cutting depth is only in the region of the tooth depth.

The saw blade itself can be provided with openings, for example in the form of curved slots or the like. This advantageously influences the vibration characteristics of the saw blade and reduces the sound-radiating surface thereof.

Further details, features and advantages of the invention are disclosed in the description hereinbelow of exemplified embodiments, illustrated in the accompanying drawing, and in the annexed claims.

Figure 1:
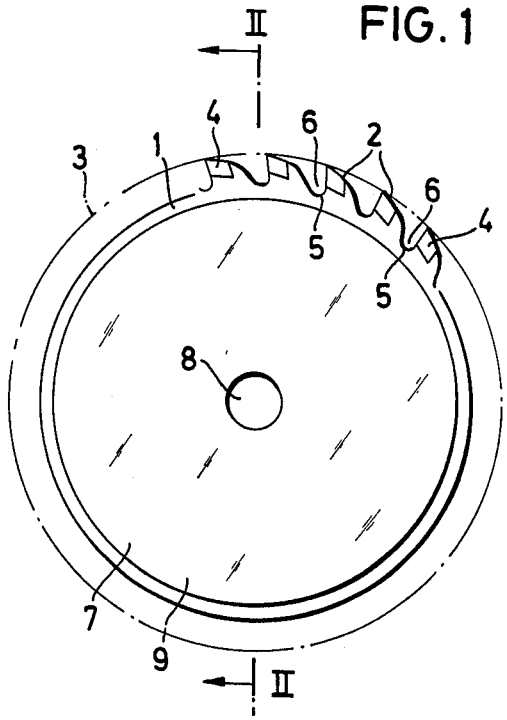
Figure 3:
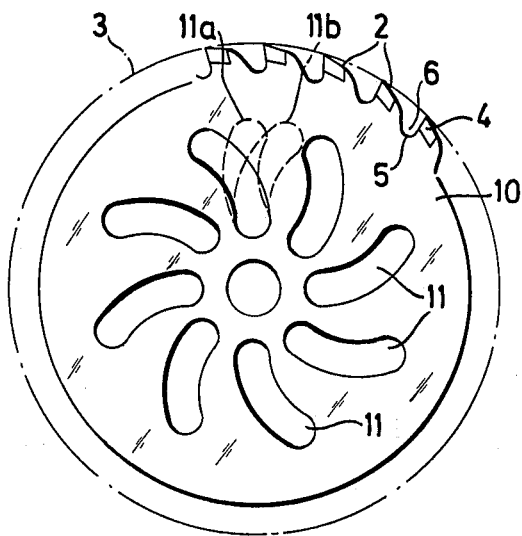
Figure 5:
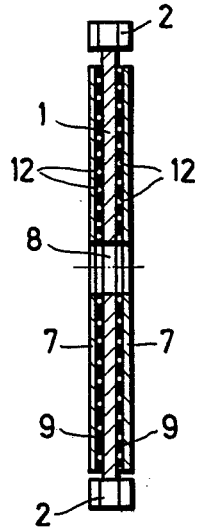
Figure 4:
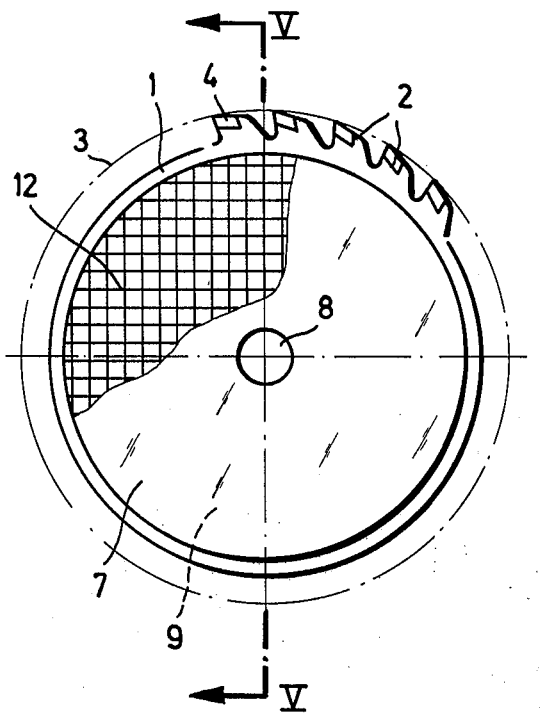

In the drawing:

FIG. 1 is a circular saw blade tool according to the invention shown as a side view, FIG. 2 is a section along the line II—II of FIG. 1, FIG. 3 is a modified embodiment of the saw blade prior to the attachment of the coverings, FIG. 4 is another embodiment of the circular saw tool and FIG. 5 is a section along the line V—V of FIG. 4.

The circular saw tool illustrated in FIGS. 1 and 2 comprises, as the basic member, a disc-shaped saw blade 1 of steel, the circumference of which is provided with teeth 2. Only part of the teeth distributed over the entire circumference is shown, the dash-dot line 3 indicating the pitch circle of the tooth tips. The teeth 2 can be provided with soldered cemented carbide tips 4 or can be constructed in some other manner. The numeral 5 in each case refers to the base of the tooth gaps 6.

Coverings 7, each of which has the shape of a thin round blank and extends from the middle bore 8 of the saw blade 1 to a region close to the tooth gap base 5, are mounted on both sides of the saw blade 1 by means of an adhesive, namely a synthetic resin adhesive. The overall thickness of the unit comprising the saw blade 1, the two layers of adhesive 9 and the coverings 7 is slightly less than the maximum width B of the tool in the region of the teeth 2.

The coverings 7 can consist of brass. Advantageously, the thickness of the coverings amounts to a few tenths of a millimeter. It has been found that a thickness of 0.2 to 0.26 mm achieves very good sound suppression in the frequency range of approximately 2 to 5 kHz for the tool which is engaged in the cutting operation. The noise radiated by the saw during the cutting operation usually has the greatest amplitudes in this range. Furthermore, unpleasant whistling in idling operation is prevented by a saw blade which is provided with coverings of the kind described hereinbefore.

As indicated in FIG. 3, the saw blade 10 can have a number of openings 11, more particularly in the shape of curved slots. The numerals 11a and 11b in FIG. 3 indicate further possible shapes of the openings. A construction of this kind reduces the size of the soundradiating area of the saw blade and the vibration characteristics thereof are simultaneously altered in an advantageous manner.

A tool of the illustrated kind, in which the saw blade has 10 openings and is provided with coverings 7, produces a sound pressure level which is lower by approximately 8 to 10 dB (A) compared with a saw blade without openings and without covers (measured at a distance of one meter from the saw in an extension of the saw axis). No further unpleasant whistling occurs during idling.

In the embodiment illustrated in FIGS. 4 and 5, an insert 12 in the form of a mesh, fabric or network is disposed between the saw blade 1 and the coverings 7 in the layers of adhesive 9. The covering 7 is shown in partially fractionated form in FIG. 4 to reveal a view of the insert 12. Such an insert, bearing on the one hand on the saw blade 1 and on the other hand on the covering 7, but in all other respects surrounded by the adhesive, can be used in the production of the tool or subsequent attachment of coverings to achieve a desired uniform thickness for the layer of adhesive, in which case the insert has the corresponding overall thickness and consists of a suitable material, namely metal, but where appropriate also some other suitable material. The invention provides more particularly that the network or mesh-like insert 12 consists of a metal with good thermal conductivity, more particularly copper. The heat generated during operation of the tool will then be rapidly dissipated via the insert outwardly to the coverings and from there to the air.

All features mentioned in the description hereinbefore or illustrated in the accompanying drawing are to be regarded as being inventive features either by themselves or in combination to the extent permitted by the prior art.

We claim:

1. A circular saw tool, with a single-ply or multi-ply disc-shaped saw blade and teeth distributed over the circumference thereof, the saw blade being provided on each side with a covering having the shape of a thin round blank and an intermediate layer consisting of an adhesive having a high degree of elasticity which connects the covering to the blade, said coverings together with said layers of adhesive providing a noise suppression system as well as an encapsulation on both sides of the saw blade for reducing noise radiated by the saw blade.

2. A tool according to claim 1, wherein the covering consists of metal.

3. A tool according to claim 2, wherein the covering consists of brass.

4. A tool according to claim 2, wherein the thickness of the covering on each side is in the range of 0.2 to 0.26 millimeters.

5. A tool according to claim 1, wherein the thickness of the covering on each side is of the order of magnitude of a few tenths of a millimeter.

6. A tool according to claim 1, wherein the covering on each side extends in the radial direction substantially from the central bore of the saw blade to the region of the tooth gap bases.

* * * * *